UNITED STATES PATENT OFFICE 2,625,522

SEALING COMPOUND

Albert C. Fischer and William H. Walker, Chicago, Ill.; said Walker assignor to said Fischer; Wallace C. Fischer and Cecile G. Fischer, executors of said Albert C. Fischer, deceased, assignors to Servicised Products Corporation, a corporation of Illinois No Drawing. Application October 29, 1949, Serial No. 124,507

4 Claims. (Cl. 260—23.3)

This invention relates to a sealing composition, and more particularly to a sealing composition characterized by a high degree of yieldability, elasticity, cohesive force and the capability of tenacious adhesion with adjacent bodies of the same or different material. These characteristics are not affected by extremely low temperatures and particularly temperatures ranging as low as from 0° to 15° F.

This application is a continuation-in-part of our copending application Serial No. 575,935, filed February 2, 1945, now U. S. Patent 2,511,830, issued June 20, 1950.

One object of the present invention is to provide a sealing composition containing a rubbery vegetable polymerized oil, resin constituents and small proportions of plasticizing agents such as an oily flux and fillers such as asbestos dust, clay and the like.

Another object of the invention is to provide such a composition comprising, by weight, 26 to 35% of a rubbery vegetable polymerized oil, 35 to 45% of a coumarone-indene resin, 16 to 25% of a residual asphalt oil, and the remainder fillers and pigments.

When resins such as coumarone-indene resins are employed in place of the asphalt constituent disclosed in our prior Patent 2,511,830, colored pigmenting agents may be added for the purpose of matching any colors of the structural elements sought to be sealed by the composition in accordance with the present invention; whereas in cases where asphalt is used, the sealing compound is colored black.

The present invention provides a sealing composition which requires no primer in conjunction to effect an adhesion between the composition and the surfaces of the spaces in which the composition is used. The adhesion between the body of the sealing composition and the walls is maintained under all ordinary temperature conditions. Thus the composition is particularly useful in the sealing of joints between concrete under the severest atmospheric conditions. The sealing composition in accordance with the present invention may be used economically in the fabrication of expansion joints for concrete constructions. The composition may be used as a capping strip over expansion joints or fibrous material of all types. When the sealing composition is heated and poured above the main body of the expansion joint, to the depth of one to two inches, the adhesive force between the body of the sealing composition and the end surfaces of the structural sections of the expansion joint is sufficient to maintain the integrity of the joint at the upper portion thereof despite any permanent contraction of the expansion joint material below the capping strip. Thus, the entry of moisture and sand into the expansion joint from the upper surface of the roadway is positively excluded by the effective seal at the upper surface thereof. This efficiency is attained in conjunction with the economical use of a comparatively small amount of the sealing composition, namely of a depth of less than two inches in comparison to the approximately ten or twelve inches of fibrous sheeting material which occupies the remainder of the expansion joint spaced between the concrete sections.

The fact that an effective bond is maintained under all temperature conditions between the contacting surfaces of the sealing compound and the sections being sealed, without the necessity of any priming operations, results in manufacturing economies in the fabrication and joining of the structural sections in which such sealing medium is used.

The polymerized oil of rubbery nature, plasticizing agent, mineral filler and the like of the composition are compounded in such a manner as to produce a homogeneous product having the texture of licorice sticks, which may be distended when pulled, but which has marked restoring forces which render the composition ideally suited to expansion joint uses. Aside from the strong cohesive force existing between the molecules of the composition to produce a yieldable and highly elastic substance, the material has a tacky texture which is effective in adhesively engaging bodies of other materials such as concrete, metal and wood to adhere thereto in the course of following the movements of these materials as is the case of expansion joints. Also the waterproof sealing joints obtainable with this material render it useful in the field of contraction joints.

The new composition described herein may also be cut with suitable solvents and emulsifying agents to produce waterproofing coatings and emulsions such as paints, damp-proofing compounds and the like.

One of the principal advantages of the present invention is the retention of the properties of the material described above, such as yieldability, elasticity, adhesive tenacity, waterproofness, etc. at freezing temperatures, at which such products normally become brittle and lose their efficacy in the applications for which such materials are used.

The material in accordance with the present invention may be formed or extruded, or molded into different shapes which are particularly adapted to expansion joints and keying means used in connection with such joints. The same may also be used in large masses which may be liquified by the application of a controlled amount of heat thereto preparatory to the pouring thereof into expansion joints or other molded forms. This material is particularly useful in the field of expansion joints by virtue of its capability of sealing the joint against the ingress of water to the subsoil of a pavement or roadway which is effective under all temperature conditions and which is capable of being restored to its original state and position upon the recurrence of normal temperatures. Its capability of maintaining a bond at the joining surface thereof to the pavement sections after the melted composition is poured into the joint and is permitted to harden assures the maintenance of the integrity of the expansion joints in which the same is used. This property of the material, which may be designated as its "elastically cohesive property," enables the composition to be extended to a marked degree upon the application of forces thereto, which upon the release of the latter permits the material to revert to its former form, while the material possesses the property of adhering to surfaces adjoining it with such tenacity that this extension takes place without releasing its hold on the surfaces in contact therewith.

The sealing composition of this invention is preferably compounded by combining approximately 26–35% by weight of a polymerized oil, such as linseed oil, soy bean oil, sesame oil, castor oil, rape seed oil, or the like, 35–45% of a hardenable coumarone-indene resin and 16–25% of residual asphalt oil. The composition should also include finely-divided inert fillers, preferably in an amount of between 5–10% by weight of the composition. Preferred fillers are 3–5% clay, 0.5–1.5% asbestos fibers and 1.5–3.5% exfoliated vermiculite. These fillers are mixed into the mass until a uniform consistency is obtained. If desired, a small amount of a coloring pigment may be used in place of some of the filler material.

In a preferred method of making the new compositions, the polymerized oil and resin are mixed together at ordinary room temperature for about one-half to one hour. After this mixing, the residual asphalt oil is added and blended into the mixture until a homogeneous mass is obtained. The fillers are then mixed into the mass until the consistency is uniform. The total time required for the mixture of a batch is ordinarily approximately 5 hours and the only heat employed is the self-generated heat resulting from the mixing. The residual asphalt oil is preferably heated to a temperature between approximately 260° and 280° F. before being mixed into the mass and some heat is supplied by this oil.

After the composition has set, it is packaged in boxes or bags preparatory to shipment to the point where it is to be used. When the composition is used, it may be heated to increase its fluidity so that it can be poured into crevasses, cracks or expansion joint spaces. If desired, the composition can be molded in strips and placed between heated surfaces, or the sides of the strips may be heated in which state it exercises its adhesive force to provide a tight bond between the compound and the surface or surfaces to which the composition is to be bonded.

One formula which has proven particularly useful is as follows:

|  | Per cent |
|---|---|
| Polymerized vegetable oil | 32.6 |
| Residual asphalt oil | 21.6 |
| Coumarone-indene resin | 38.0 |
| Clay | 4.0 |
| Asbestos dust | 1.1 |
| Exfoliated vermiculite | 2.7 |

The residual asphalt oil is an oily asphalt of a viscous liquidy nature of the type from which the heavier asphalts are blown, characterized by the following properties:

Ductility, 77° F., 5 cm. per min_____ 45 cm. to 60 cm.
Penetration, 32° F., 200 grms. 60 sec___ .66 cm.

The material is too soft to take a penetration at 77° F. with a standard needle, and is also too soft to take a melting point reading with ring and ball.

Exfoliated vermiculite is a puffed vermiculite material having the approximate formula $$3MgO-(FeAl)_3O_3.3SiO_2$$

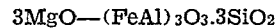

The exfoliated vermiculite plaster aggregate is used in the above composition, but if a coarser product is desired, the exfoliated vermiculite concrete aggregate may be used.

Any inert pulverized clay capable of passing an 80 mesh screen may be used for the clay ingredient and any asbestos dust, preferably of the short fiber type, such as Canadian 7R, may be used for this class of filler.

The coumarone-indene resin used in making the new composition of this invention is a coal tar product and is a polymerized resin prepared from light oil fractions of the coal tar. The fraction employed is that distilling between 150–200° C. and it is rich in indene, coumarone and homologous bodies including the methyl derivatives. These oils are polymerized, preferably by treatment with concentrated sulfuric acid, and the unreacted naphthas are distilled off. The coumarone-indene resins vary from semi-fluid viscous resins to plastic and hard, brittle grades, and in color from dark brown to pale straw color. Even the hardest resins, however, become completely fluid at temperatures above their melting points. In the composition of the present invention, the softer grades of resin are preferably employed; that is, those which remain relatively soft and plastic at temperatures as low as 0° F. or lower. The resin employed is also preferably one of the lighter colored resins so that coloring pigments may be used to give the composition any desired color. However, the darker ones can be employed, if desired, especially when the composition is to be used in installations where the dark colors are not detrimental.

The sealing compound in accordance with the present invention possess the following characteristics and properties, which may be tested in the following manner.

The material shall be suitable for melting in the usual type of asphalt kettle. It shall melt easily to a pouring consistency when uniformly heated to a temperature not exceeding 420° F. and shall adhere to the sides of the walls of monolithic material forming the joint. The material shall not crack inherently or break its bond with the walls when exposed to low temperatures and extended.

Detailed requirements

A sample of the material shall comply with the following detailed requirements when the tests are applied as described below:

| | | |
|---|---|---|
| (a) | Pouring fluidity (pour point). | Shall not exceed a temperature of 420° F. |
| (b) | Melting time | Shall not exceed 1 hour. |
| (c) | Cold adhesion test | Positive. |
| (d) | Flash point | More than 550° F. |
| (e) | Penetration, in centimeters at: | |
| | 77° F., 150 gm., 5 sec. | 0.45 to 0.75. |
| | 32° F., 200 gm., 60 sec. | More than 0.28. |
| (f) | Flow in centimeters: 5 hrs. at 140° F. at 75° angle. | 0.5 maximum. |
| (g) | Bond test, 5 cycles at 15° F. | Shall not crack or break its bond. |
| (h) | Softening point, deg. F. | Above 160° F. |

Test procedure (a) 200 grams of material cut into approximately 1" cubes are placed in an ordinary #2 open top can (3¼" diameter, 4½" height), submerged 3½" into an oil bath maintained at 450° F. (+5°). The material is considered at its pour point (minimum pouring temperature) when it can be readily poured. It shall be of a uniform consistency, capable of being poured into a half-inch joint.

(b) Melting time is considered the time necessary for the material to reach its poured point.

(c) *Cold adhesion test.*—One cubic inch of material at room temperature (77° F.) cut from unmelted sample with a cold knife is placed between dry specified bond test blocks free of dust. It is then compressed to one-half of its thickness and maintained in that position for six hours.

1. The material must "wet" the block surface and consequently an adhesive bond must result.

2. It is then cooled for one hour at 0° F., and immediately subjected to a tensile test up to 200 pounds, and it shall not break its bond.

(d) Flash point according to A. S. T. M. designation: D92–33.

(e) *Penetration test.*—Two samples of the material shall be poured according to A. S. T. M. designation D5–25 at its pour point, stirred with hot knife and allowed to cool at room temperature for two hours, after which both are transferred to their respective baths, maintained at 77° F. and 32° F. (+2° F.), both allowed to remain two hours, after which the samples are tested for penetration with a grease cone (A. S. T. M. designation D217–33T).

The penetration at 77° F. will be made with total weight of 150 grams and for a period of five seconds.

The penetration at 32° F. will be made with total weight of 200 grams and for a period of sixty seconds. The reported penetrations shall be the average of at least three tests.

(f) *Flow test.*—A portion of the molten sample shall be poured at its pour point into a mold placed on a clean tin panel. The dimensions of mold at ⅛" x 1½" (+.01"). It is then allowed to cool for 30 minutes at 77° F. and then trimmed. Test piece shall be maintained at 140° F. (+2°) in a constant temperature oven for five hours at an incline of 75°. The flow of the material is measured from start to finish in centimeters.

In applicants' prior Patent 2,511,830 referred to hereinabove the claims are directed essentially to a sealing composition comprising polymerized oil, asphalt, asphalt oil and fillers. The invention claimed in the present application is concerned primarily with a sealing composition wherein a coumarone-indene resin is used in combination with the polymerized oil, asphalt oil and fillers.

The foregoing detailed description is given for clearness of understanding only, and no unnecessary limitations should be understood therefrom, for some modifications will be obvious to those skilled in the art.

We claim:

1. A sealing compound comprising, by weight, 26 to 35% of a polymerized vegetable oil, 35 to 45% of a coumarone-indene resin that is soft and plastic at 0° F., 16 to 25% of a residual asphalt oil and finely-divided fillers.

2. The compound of claim 1 wherein said fillers include clay and asbestos dust in an amount between 5 and 10% by weight of the composition.

3. A sealing compound comprising, by weight, 26 to 35% of a polymerized vegetable oil, 35 to 45% of a coumarone-indene resin that is soft and plastic at 0° F., 16 to 25% of a residual asphalt oil, 5 to 10% of finely-divided fillers and a small amount of a coloring pigment.

4. A sealing compound comprising, by weight, 32.6% of a polymerized vegetable oil, 38.0% of a coumarone-indene resin that is soft and plastic at 0° F., 21.6% of a residual asphalt oil, 4.0% clay, 1.1% asbestos and 2.7% expanded vermiculite.

ALBERT C. FISCHER.
WILLIAM H. WALKER.

REFERENCES CITED

The following references are of record in the file of this patent:

UNITED STATES PATENTS

| Number | Name | Date |
|---|---|---|
| 1,464,224 | Stewart | Aug. 7, 1923 |